(12) United States Patent
Dommaschk et al.

(10) Patent No.: US 8,687,389 B2
(45) Date of Patent: Apr. 1, 2014

(54) APPARATUS HAVING A CONVERTER

(75) Inventors: Mike Dommaschk, Möhrendorf (DE); Jörg Dorn, Buttenheim (DE); Ingo Euler, Erlangen (DE); Franz Karlecik-Maier, Höchstadt (DE); Jörg Lang, Stadtsteinach (DE); Quoc-Buu Tu, Rosstal (DE); Carsten Wittstock, Nürnberg (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 276 days.

(21) Appl. No.: 13/062,579

(22) PCT Filed: Sep. 5, 2008

(86) PCT No.: PCT/EP2008/007555
§ 371 (c)(1),
(2), (4) Date: May 16, 2011

(87) PCT Pub. No.: WO2010/025758
PCT Pub. Date: Mar. 11, 2010

(65) Prior Publication Data
US 2011/0235375 A1    Sep. 29, 2011

(51) Int. Cl.
*H02H 7/125* (2006.01)
(52) U.S. Cl.
USPC .............................. 363/53; 363/52
(58) Field of Classification Search
USPC .............................. 363/52, 53, 54
See application file for complete search history.

(56) References Cited

U.S. PATENT DOCUMENTS

| 5,999,388 A | * | 12/1999 | Asplund | ................. 361/58 |
| 6,215,679 B1 | * | 4/2001 | Yamane et al. | ............... 363/132 |

(Continued)

FOREIGN PATENT DOCUMENTS

| DE | 69837414 T2 | 12/2007 |
| EP | 0867998 A1 | 9/1998 |
| WO | 2008074273 A1 | 6/2008 |

OTHER PUBLICATIONS

Baran et al., "Overcurrent Protection in DC Zonal Shipboard Power Systems using Solid State Protection Devices", Electric Ship Technologies Symposium, 2007, IEEE, PI May 1, 2007, pp. 221-224, XP031177068.

(Continued)

*Primary Examiner* — Adolf Berhane
*Assistant Examiner* — Emily P Pham
(74) *Attorney, Agent, or Firm* — Laurence A. Greenberg; Werner H. Stemer; Ralph E. Locher

(57) ABSTRACT

A device has a converter which is connected to a direct voltage circuit through a short-circuit protection unit. The short-circuit protection unit is arranged at least partially in the direct voltage circuit and is provided in the direct voltage circuit to suppress short-circuit current flowing through the converter. The device contains one or more controllable power semiconductors, wherein a protection element is arranged in parallel to at least one of the controllable power semiconductors. The device prevents the negative effects of a short circuit occurring in the direct voltage network in a particularly reliable manner. For this purpose, the protection element is an energy store.

8 Claims, 4 Drawing Sheets

(56) References Cited

U.S. PATENT DOCUMENTS

| | | | |
|---|---|---|---|
| 6,633,092 B2 * | 10/2003 | Dahler et al. | 307/100 |
| 7,206,179 B2 * | 4/2007 | Miyamoto | 361/118 |
| 7,586,725 B2 * | 9/2009 | DiVito et al. | 361/93.1 |
| 8,390,968 B2 * | 3/2013 | Dorn et al. | 361/54 |
| 8,462,530 B2 | 6/2013 | Dommaschk et al. | |
| 2005/0083716 A1 * | 4/2005 | Marquardt | 363/132 |

OTHER PUBLICATIONS

Mohan, Underlan, Robbins, "Power Electronics—Converters, Applications and Design", 2003, John Wiley & sons, Inc., U.S.A., pp. 671-675, XP002531542.

Kristic et al., "Circuit Breaker Technologies for Advanced Ship Power Systems", Electric Ship Technologies Symposium, IEEE, PI, May 1, 2007, pp. 201-208, XP031177065.

Pauli et al., "Development of a High Current HVDC Circuit Breaker with Fast Fault clearing Capability" IEEE Transactions on Power Delivery, IEEE Service Center, New York, NY, US, vol. 3, No. 4, Oct. 1, 1988, pp. 2072-2080, XP000001570.

Brice et al., Review of Technologies for Current-Limiting Low-Voltage Circuit Breakers, IEEE Transactions on Industry Applications, IEEE Service Center, Piscataway, NJ, US, vol. 32, No. 5, Oct. 1, 1996, XP011022063.

* cited by examiner

APPARATUS HAVING A CONVERTER

BACKGROUND OF THE INVENTION

Field of the Invention

The invention relates to an apparatus having a converter which is connected to a DC voltage circuit via a short-circuit protection device, which is arranged at least partially in the DC voltage circuit and is designed to suppress a short-circuit current flowing via the converter in the DC voltage circuit, and has one or more controllable power semiconductors, wherein a protection element is arranged in parallel with at least one of the controllable power semiconductors.

An apparatus such as this has already been disclosed in DE 698 37 414 T2. This document describes an apparatus having a self-commutated converter (so-called voltage source converter), which is connected between an AC voltage grid system and a DC voltage grid system and is designed to transmit electrical power between the DC voltage grid system and the AC voltage grid system. For this purpose, the converter converts DC voltage to AC voltage, or vice versa. The apparatus also has a short-circuit protection device, which is arranged in the DC voltage grid system and has a plurality of series-connected controllable power semiconductors, with a surge arrester in each case being arranged in parallel with each of the controllable power semiconductors.

In order to prevent a short circuit occurring in the DC voltage grid system from destroying any components of the converter, the short-circuit protection device limits the current in the DC voltage circuit to an acceptable level. For this purpose, at least one of the controllable power semiconductors is switched off. A voltage rise then quickly occurs across the power semiconductor that has been switched off. A surge arrester is provided as a protection element in parallel with the switched-off power semiconductor and reacts with a low impedance above a voltage threshold value. Since the short-circuit current is passed via the surge arrester, which then has a low impedance, this limits the current in the DC voltage circuit, protecting the converter.

Since the short-circuit current level cannot be predicted, the number of power semiconductors to be controlled, and possibly also the control frequency, must be matched to the respective circumstances within the scope of this prior art. The relative closed-loop control effort for controlling this apparatus conceals the risk that short-circuit currents which occur suddenly will not be adequately limited sufficiently quickly. This can lead to destruction of converter components.

BRIEF SUMMARY OF THE INVENTION

The object of the invention is therefore to provide an apparatus of the type mentioned initially which reliably prevents the negative effects of a short circuit occurring in the DC voltage grid system.

The invention achieves this object by the protection element being an energy store.

According to the invention, the protection element is used for safe interruption of the short-circuit current, by being an energy store. In contrast to this, the protection element according to the prior art is used to limit the short-circuit current, by being a surge arrester. This means that the short-circuit protection device according to the invention interrupts a short-circuit current safely and quickly without any risk of destroying one of the switched-off power semiconductors in the short-circuit protection device. In contrast to this, according to the prior art, the short-circuit current is limited in steps by means of the known short-circuit protection device, thus resulting in a risk of destruction of converter components during the current limiting process.

The total number of the one or more, possibly series-connected, controllable power semiconductors in the short-circuit protection device according to the invention is chosen such that no voltage which exceeds the withstand voltage of the power semiconductor occurs across any of the simultaneously switched-off power semiconductors when short-circuit voltages occur. In other words, the one or more controllable power semiconductors in the short-circuit protection device are designed to block the maximum short-circuit voltage that occurs. The energy store connected in parallel with at least one of the controllable power semiconductors is used to ensure that minor time differences in controlling the power semiconductors and therefore minor differences in the switching off of the power semiconductors do not lead to an incorrect distribution of the voltage dropped across the components, which would be damaging to the power semiconductors.

By way of example, the apparatus having a converter is part of a high-voltage direct-current transmission installation (HVDCT installation). HVDCT installations such as these can transport electrical power, which is in the form of AC voltage, over long distances via a DC voltage grid system, by transformation of the AC voltage to DC voltage in a converter, with the electrical power being converted back to AC voltage at the arrival location via a further converter. The two converters are in this case of identical design and, according to the invention, each of these converters can be protected by at least one short-circuit protection device against short circuits occurring in the DC voltage grid system. However, the apparatus having a converter could also be a part of the electrical drive apparatus of a rail vehicle. The apparatus according to the invention is, of course, not restricted to the exemplary embodiments mentioned.

As has already been described, the converter is used to convert AC voltage to DC voltage, and vice versa. The design of converters such as these is known. By way of example, this may be a so-called self-commutated converter with a DC voltage link circuit using two-point or three-point technology, or a self-commutated converter with a DC voltage link circuit and multilevel topology (so-called modular multilevel voltage source converter). The design of converters such as these is known and comprises series circuits of submodules which have one or more controllable power semiconductors, each having a freewheeling diode arranged back-to-back with them. When a short circuit occurs in the DC voltage grid system, the AC voltage grid system drives a current via the freewheeling diodes in the converter to the fault location that caused the short circuit. During the process, the freewheeling diodes, which carry the short-circuit current, are destroyed. In order to prevent this, according to the invention, the short-circuit protection device which interrupts the short-circuit current is arranged in the DC voltage link circuit. In contrast, comparatively fast interruption of the short-circuit current would be impossible using a conventional, mechanically switching, circuit breaker.

The energy store can advantageously be a capacitor.

The capacitor connected in parallel with the controllable power semiconductor is in this case designed such that, when the power semiconductor is switched off, this does not lead to a sudden rise in the voltage dropped across the power semiconductor and therefore, with short time differences between the power semiconductors being switched off, to any incorrect distribution of the voltage within the series circuit that would be damaging to these power semiconductors.

It may also be considered advantageous to connect a diode in each case back-to-back in parallel with each controllable power semiconductor.

This so-called freewheeling diode is additionally used for protection against overvoltages when the controllable power semiconductor is switched off. The overvoltages occur because of inductances in the short-circuit circuit to be switched off. The freewheeling diode prevents such voltage peaks.

It may also be considered advantageous to arrange at least two controllable power semiconductors, which follow one another in a series circuit, back-to-back, and to bridge them by a common capacitor.

According to this exemplary embodiment, the short-circuit protection device interrupts a short-circuit current independently of its current direction. This makes it possible to use the apparatus according to the invention in installations in which the current can flow in both directions in the DC voltage link circuit.

It is advantageously also possible for the converter to have power semiconductor valves which each have a series circuit of submodules, and the short-circuit protection device has a series circuit of submodules, wherein the submodules of the short-circuit device and the submodules of the converter are of identical design.

The use of standard components reduces the procurement costs for the apparatus according to the invention.

According to one advantageous refinement of the invention, the submodule has two controllable power semiconductors which are connected in the same sense in series and are bridged by a common capacitor.

According to a further advantageous refinement of the invention, the apparatus has a detection device for detection of a short-circuit current, and a control apparatus for controlling at least one of the power semiconductors in the short-circuit protection device, wherein the detection device is connected to the control device via a communication line.

A further advantageous refinement of the invention provides that the controllable power semiconductor is a bipolar transistor with an insulated gate electrode (IGBT).

It can also be considered advantageous for the controllable power semiconductor to be a thyristor.

Further advantages and refinements of the invention are the subject matter of the description of exemplary embodiments of the invention with reference to the figures of the drawings, in which the same reference symbols refer to components having the same effect, and in which:

DESCRIPTION OF THE INVENTION

Figure 1:
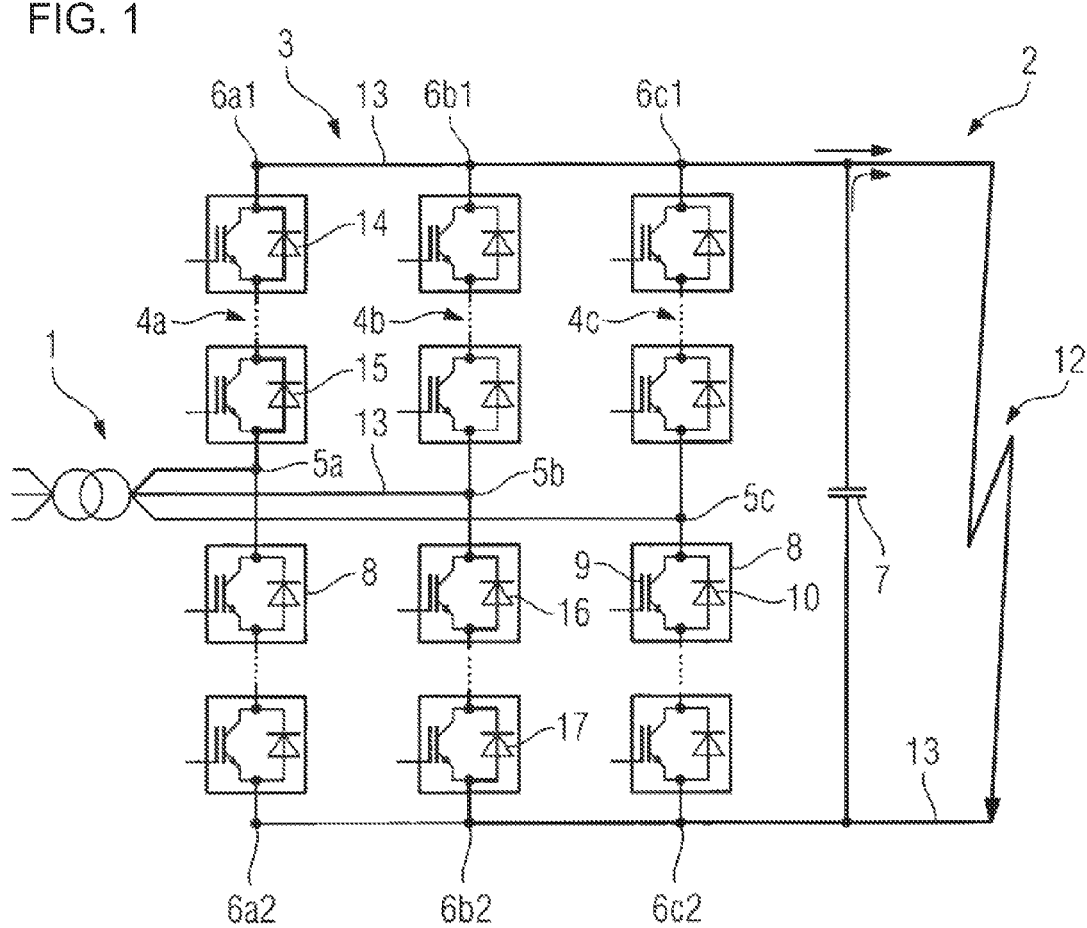
FIG. 1 shows a short-circuit current path in a self-commutated converter (VSC) using two-point technology, illustrated schematically.

FIG. 1 shows a self-commutated converter 3 (VSC) using two-point technology, which is designed for power transmission between an AC voltage grid system 1 and a DC voltage grid system 2. For this purpose, the three-phase AC voltage grid system 1 is connected by a respective AC voltage connection 5a, 5b, 5c to one of three phase module branches 4a, 4b, 4c of the converter 3. Each of the three phase module branches 4a, 4b, 4c has two DC voltage connections 6a1, 6a2, 6b1, 6b2, 6c1, 6c2 for connection to the DC voltage grid system 2. The phase module branches 4a, 4b, 4c have a series circuit formed by submodules 8, of which in each case two are illustrated for each valve branch in FIG. 1. However, there may be any desired number of submodules within the scope of the invention, and the number may even be greater than 100. Each submodule 8 is provided by a parallel circuit formed by a controllable power semiconductor 9 and a freewheeling diode 10 connected back-to-back to it. An intermediate-circuit capacitor 7 in the converter 3 is connected in parallel with the three phase module branches 4a, 4b, 4c.

In the event of a short circuit, as indicated by the reference symbol 12, in the DC voltage circuit, a short-circuit current fed from the AC voltage grid system 2 is created, inter alia along a short-circuit current path 13. This short-circuit current path 13 is, for example, selected from a multiplicity of possible short-circuit current paths. The freewheeling diodes 14, 15, 16, 17 located on the short-circuit current path 13, as well as the intermediate-circuit capacitor 7 will be destroyed or damaged after even a short time because of the high current along the short-circuit current path 13.

Figure 2:
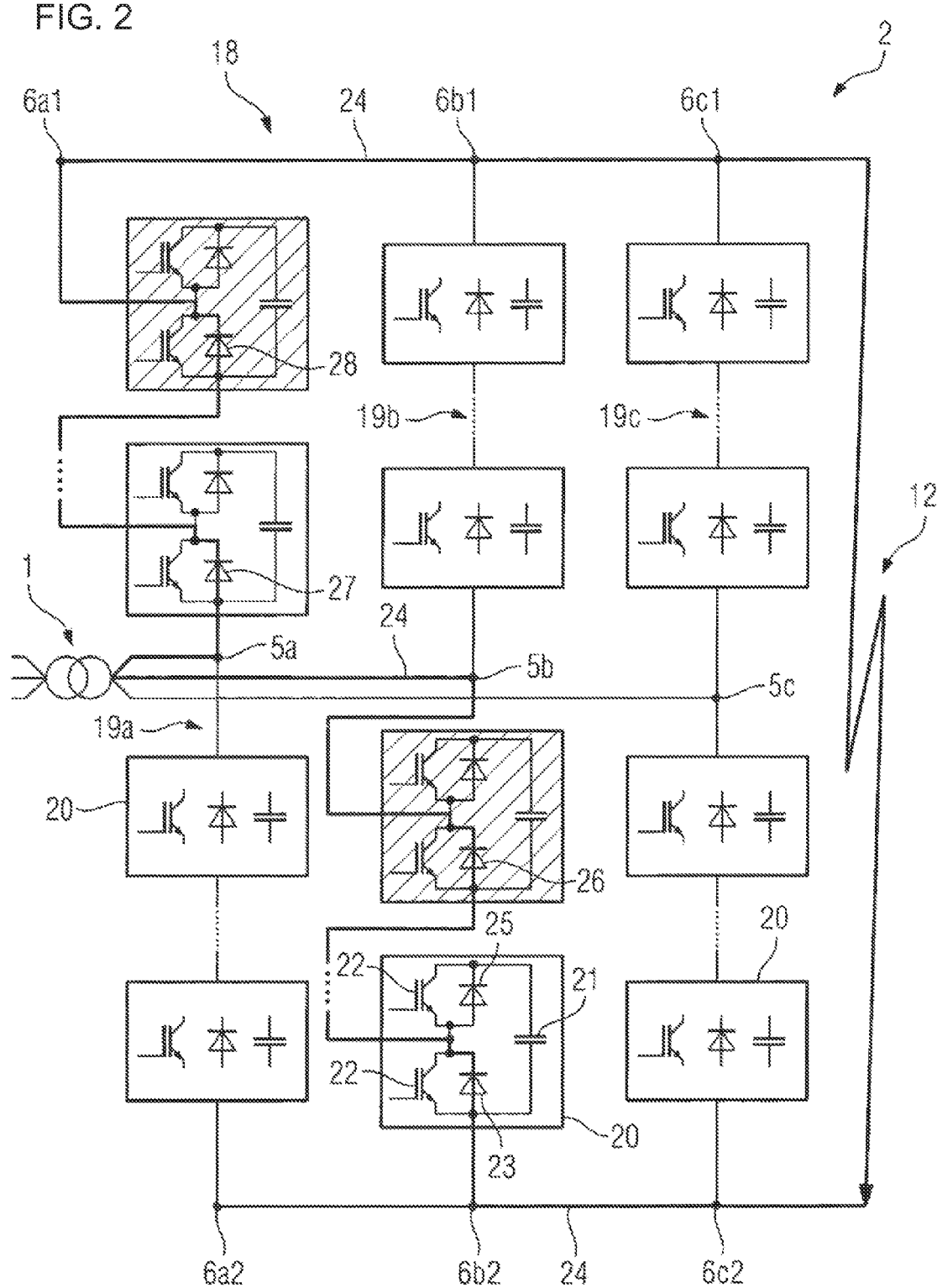
FIG. 2 shows a short-circuit current path in a self-commutated converter (VSC) using so-called multilevel topology, illustrated schematically.

FIG. 2 shows a short-circuit current path in a self-commutated converter 18 (VSC), in which, in contrast to FIG. 1, the converter 18 is designed using so-called multilevel topology. The phase module branches 19a, 19b, 19c are once again respectively connected by an AC voltage connection 5a, 5b, 5c to one phase of an AC voltage grid system 1, and via two DC voltage connections 6a1, 6a2, 6b1, 6b2, 6c1, 6c2 to a DC voltage grid system 2. With reference to the converter 3 in FIG. 1, the series-connected submodules 20 in the phase module branches 19a, 19b, 19c are, however, designed differently. In particular, the capacitance of the central capacitor shown in FIG. 1 is distributed between a multiplicity of submodules in the exemplary embodiment shown in FIG. 2. Each of the submodules therefore has its own capacitor. Furthermore, a series circuit of two controllable power semiconductors 22, arranged in the same sense, is connected in parallel with each capacitor 21, and each of these power semiconductors 22 has a freewheeling diode 23, 25 arranged back-to-back in parallel with it.

In the event of a short circuit 12 occurring in the DC voltage grid system 2, a short-circuit current fed from the AC voltage grid system 2 is once again created, inter alia along the short-circuit current path 24. By way of example, this short-circuit current path 24 is also selected from a multiplicity of possible short-circuit current paths. The freewheeling diodes 23, 26, 27, 28 which are located on the short-circuit current path 24 will be destroyed or damaged in a short time because of the high current along the short-circuit current path 24.

Figure 3:
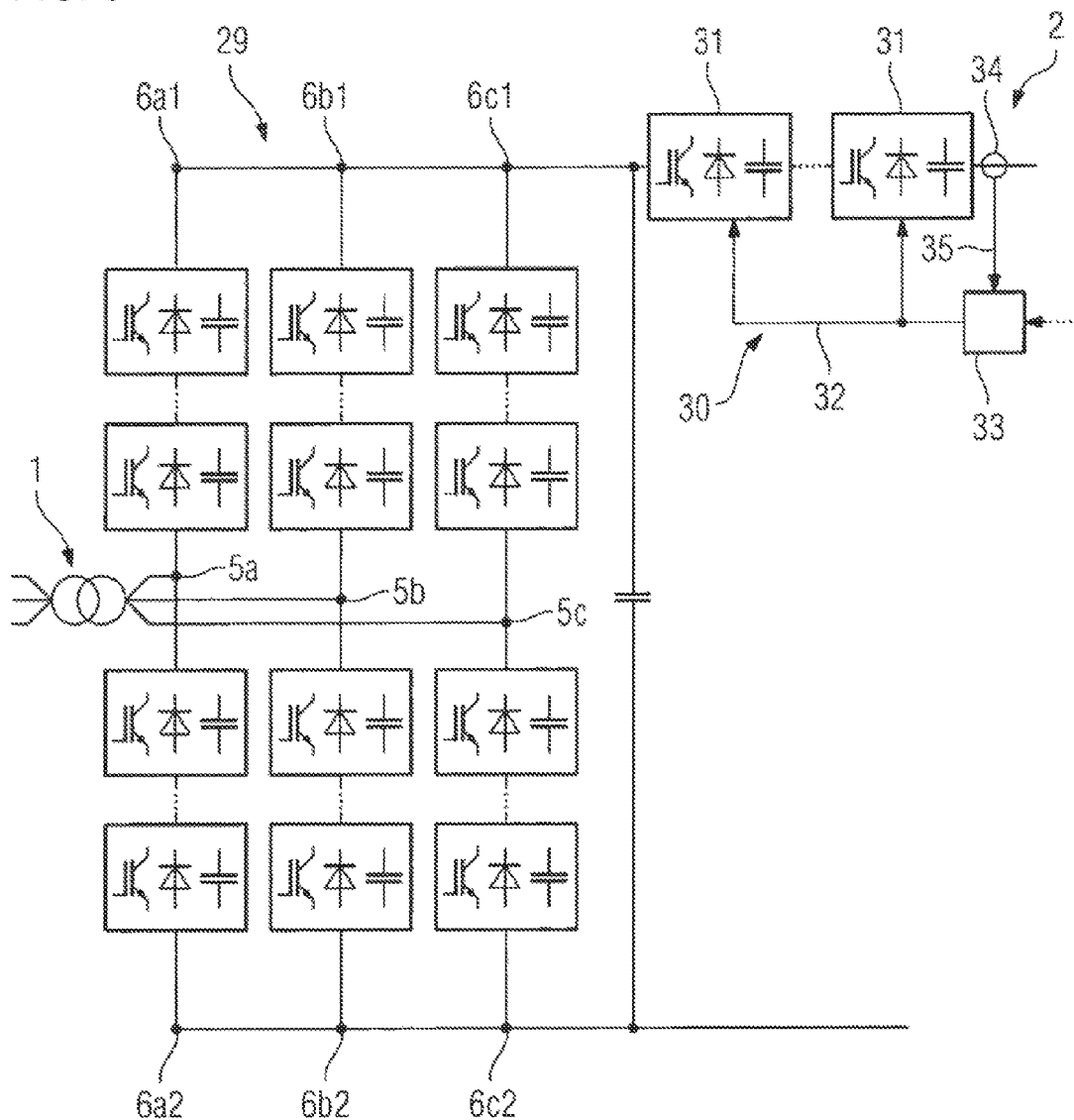
FIG. 3 shows a first exemplary embodiment of the apparatus according to the invention, illustrated schematically.

FIG. 3 shows a first exemplary embodiment of the apparatus according to the invention having a converter 29 which is connected by AC voltage connections 5a, 5b, 5c to an AC voltage grid system 1, and by DC voltage connections 6a1, 6a2, 6b1, 6b2, 6c1, 6c2 to a DC voltage circuit 2. The converter 29 is a self-commutated converter (VSC) using multilevel topology, and has a series circuit of bipolar submodules, which each have an associated energy store, for example in the form of a capacitor. A power semiconductor circuit is connected in parallel with the energy store and can be used to produce the voltage dropped across the energy store or a zero voltage at the submodule connection. Within the scope of the invention, the converter may, however, in principle have any desired topology, which means that two-stage, three-stage or five-stage VSCs are also possible. In FIG. 3, a capacitor is shown between the poles of the DC voltage link circuit, as typically occurs only in the case of two-stage VSCs. This is intended to indicate that any desired converter topology may in principle be used. A short-circuit protection device 30 is arranged in the DC voltage circuit 2 with a series circuit, arranged in the DC voltage circuit 2, of submodules 31 which have at least one controllable power semiconductor, and a capacitor connected in parallel with it. The controllable power semiconductors in the submodules 31 are connected to a control apparatus 33 via a control line 32. In addition to the submodules 31, a detection device 34 is arranged in the DC voltage grid system 2, and is connected to the control apparatus 33 via a communication line 35.

In the event of a short circuit occurring in the DC voltage circuit 2, the detection device 34 detects a short-circuit current and sends a detection signal to the control apparatus 33, in response to which the control apparatus 33 switches the power semiconductors in the submodules 31 to a state in which they block the current. The short-circuit protection device 30 therefore leads to the short-circuit current being interrupted in the DC voltage circuit 2, thus protecting the components of the converter 29.

Figure 4:
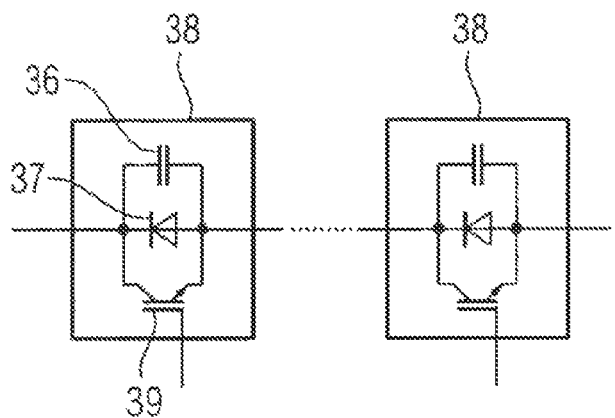
FIG. 4 shows a detail of a second exemplary embodiment of the short-circuit protection device according to the invention, illustrated schematically.

FIG. 4 illustrates the design of a submodule according to a second exemplary embodiment. The illustration shows two of a plurality of series-connected submodules 38 in the short-circuit protection device. The submodules 38 have a controllable power semiconductor 39 and, in parallel with it, a capacitor 36 and a freewheeling diode 37, with the freewheeling diode 37 being connected back-to-back in parallel with the power semiconductor 39.

A current flowing through the submodules 38 in one direction is blocked by operating the power semiconductors 39 simultaneously. In this case, the capacitors 36 result in short time differences in the operation of the power semiconductors 39, and therefore short time differences between the power semiconductors 39 being switched off, not leading to an incorrect distribution of the voltage dropped across the series circuit, which would be damaging for the power semiconductors 39.

Figure 5:
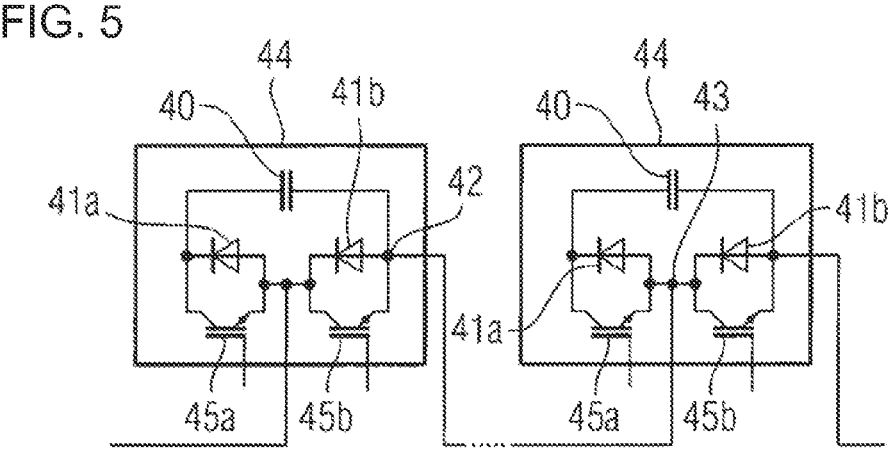
FIG. 5 shows a detail of a third exemplary embodiment of the short-circuit protection device according to the invention, illustrated schematically.

FIG. 5 shows a further embodiment 44 of the submodules illustrated in FIG. 4, according to a third exemplary embodiment. The submodules 44 are designed using multilevel topology, corresponding to the submodules in a self-commutated converter, and comprise a series circuit of two controllable power semiconductors 45a, 45b which block the current in the same direction. A freewheeling diode 41a, 41b is respectively connected back-to-back in parallel with the power semiconductors 45a, 45b. A capacitor 40 is arranged in parallel with the series circuit. Each of the bipolar submodules 44 is connected, starting from a connecting terminal 42, to a connecting terminal 43 of an adjacent submodule 44, with the connecting terminal 43 being conductively connected to the potential point between the power semiconductors 45a, 45b in the adjacent submodule 44.

The illustrated series circuit of submodules 44 makes it possible to block a current in a current direction which is in the opposite direction to the freewheeling diodes 41a, 41b.

Figure 6:
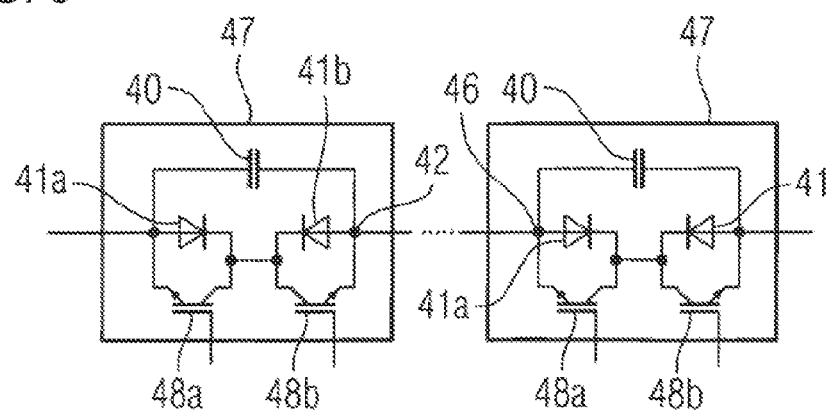
FIG. 6 shows a detail of a fourth exemplary embodiment of the short-circuit protection device according to the invention, illustrated schematically.

FIG. 6 shows a further embodiment 47 of the submodules illustrated in FIG. 4, according to a fourth exemplary embodiment. In contrast to submodules 44 in FIG. 5, the submodules 47 have power semiconductors 48a, 48b which block current in the opposite direction. The submodules are connected, starting from a connecting terminal 42, to a connecting terminal 46 of an adjacent submodule 47.

The series circuit of the submodules 47 makes it possible to block a current in both current directions.

LIST OF REFERENCE SYMBOLS

1 AC voltage grid system
2 DC voltage grid system
3 Converter
4a, 4b, 4c Phase module branch
5a, 5b, 5c AC voltage connection
6a1, 6a2, 6b1, DC voltage connection
6b2, 6c1, 6c2
7 Intermediate-circuit capacitor
8 Submodule
9 Controllable power semiconductor
10 Freewheeling diode
12 Short circuit
13 Short-circuit current path
14, 15, 16, 17 Freewheeling diode
18 Converter
19a, 19b, 19c Phase module branch
20 Submodule
21 Capacitor
22 Controllable power semiconductor
23 Freewheeling diode
24 Short-circuit current path
25, 26, 27, 28 Freewheeling diode
29 Converter
30 Short-circuit protection device
31 Submodule
32 Control line
33 Control apparatus
34 Detection device
35 Communication line
36 Capacitor
37 Freewheeling diode
38 Submodule
39 Controllable power semiconductor
40 Capacitor
41a, 41b Freewheeling diode
42 Connecting terminal
43 Connecting terminal
44 Submodule
45a, 45b Controllable power semiconductor
46 Connecting terminal
47 Submodule
48a, 48b Controllable power semiconductor

The invention claimed is:
1. An apparatus, comprising:
a short-circuit protection device;
a converter to be connected to a DC voltage circuit via said short-circuit protection device, said short-circuit protection device disposed at least partially in the DC voltage circuit and configured to suppress a short-circuit current flowing via said converter in the DC voltage circuit, said converter having a series circuit of submodules each having power semiconductor valves; and said short-circuit protection device having a series circuit of further submodules each with at least one controllable power semiconductor and a protection element disposed in parallel with said at least one controllable power semiconductor, said protection element being an energy store, said further submodules of said short-circuit protection device and said submodules of said converter being of an identical design.

2. The apparatus according to claim 1, wherein said energy store is a capacitor.

3. The apparatus according to claim 1, wherein said short-circuit protection device has a diode connected back-to-back in parallel with said at least one controllable power semiconductor.

4. The apparatus according to claim 1, wherein said at least one power semiconductor is one of at least two controllable power semiconductors which follow one another in a series circuit and disposed back-to-back and are bridged by said energy store being a common capacitor.

5. The apparatus according to claim 1, wherein said submodules and said further submodules each have two controllable power semiconductors which are connected in a same sense in series and are bridged by said protection element being a common capacitor.

6. The apparatus according to claim 1, wherein said short-circuit protection device contains:
   a detection device for detecting a short-circuit current;
   a control apparatus for controlling said at least one power semiconductor; and
   a communications line connecting said detection device to said control apparatus.

7. The apparatus according to claim 1, wherein said controllable power semiconductor is a bipolar transistor with an insulated gate electrode.

8. The apparatus according to claim 1, wherein said controllable power semiconductor is a thyristor.

* * * * *